US012502601B1

(12) United States Patent
Li et al.

(10) Patent No.: US 12,502,601 B1
(45) Date of Patent: Dec. 23, 2025

(54) PUZZLE BOARD

(71) Applicants: Bassoul Morris Albert, New York, NY (US); Zepeng Zhu, Ningbo (CN); Xiaopin Li, Ningbo (CN)

(72) Inventors: Xiaopin Li, Ningbo (CN); Bassoul Morris Albert, New York, NY (US); Zepeng Zhu, Ningbo (CN)

( * ) Notice: Subject to any disclaimer, the term of this patent is extended or adjusted under 35 U.S.C. 154(b) by 0 days.

(21) Appl. No.: 19/035,589

(22) Filed: Jan. 23, 2025

(30) Foreign Application Priority Data

Jan. 14, 2025 (CN) ........................ 202520079671.5

(51) Int. Cl.
*A63F 9/10* (2006.01)
*A47B 13/08* (2006.01)
*F16C 33/38* (2006.01)

(52) U.S. Cl.
CPC .......... *A63F 9/1044* (2013.01); *A47B 13/081* (2013.01); *F16C 33/38* (2013.01); *A63F 2009/105* (2013.01)

(58) Field of Classification Search
CPC .. A63F 9/1044; A63F 2009/105; A47B 13/08; A47B 11/00; A47B 49/00; A47B 2200/02; A47B 25/00
USPC ............................ 108/91, 22, 90; 248/188.9
See application file for complete search history.

(56) References Cited

U.S. PATENT DOCUMENTS 3,884,476 A * 5/1975 Sanders ................ A63F 9/1044 273/157 R
4,635,894 A * 1/1987 Sammons ............. F16M 11/08 384/615
4,865,325 A * 9/1989 Stolz ..................... A63F 9/1044 273/157 R
5,479,867 A * 1/1996 Blevins .................. A47B 49/00 108/22
D400,600 S * 11/1998 Ackerman ................... D21/478
6,648,430 B2 * 11/2003 Rohde ...................... A47B 1/05 312/301
6,659,023 B2 * 12/2003 Saltzman .............. A47B 13/08 108/90
7,552,821 B1 * 6/2009 Demers ................ A63F 9/1044 206/499

(Continued)

FOREIGN PATENT DOCUMENTS

CN 217794453 U 11/2022
CN 219185795 U 6/2023

(Continued)

*Primary Examiner* — Jose V Chen

(74) *Attorney, Agent, or Firm* — Mehdi (Afshin) Zamanpour

(57) ABSTRACT

A puzzle board includes a top board, a frame, a bottom board, and a base. The top board includes an upper board, a first bounding box, and limit blocks. The frame includes a border formed by splicing second bounding boxes set on four sides, and the border contains storage spaces for store items. The second bounding boxes set on an upper side and a lower side each is provided with a fluted slide assembled with the upper board, and the limit blocks are placed between the storage spaces and the second bounding boxes to restrict the upper board from slidable opening or closing the storage spaces through an external force. The bottom board is fixedly connected to a bottom surface of the frame. The puzzle board can conveniently store puzzle pieces or other small items, convenient operation and improved usage experience.

10 Claims, 11 Drawing Sheets

(56) References Cited

U.S. PATENT DOCUMENTS

| | | | | | |
|---|---|---|---|---|---|
| 7,837,161 | B2 * | 11/2010 | Chase | A47C 7/002 | 16/42 T |
| 8,322,290 | B1 * | 12/2012 | Mignano | A47B 23/043 | 248/456 |
| 12,097,443 | B2 * | 9/2024 | Che | A47B 13/088 | |
| D1,055,167 | S * | 12/2024 | Shi | D21/397 | |
| 12,220,648 | B2 * | 2/2025 | Che | A47B 83/04 | |
| D1,072,951 | S * | 4/2025 | Lin | D21/397 | |
| 12,274,356 | B1 * | 4/2025 | Che | A47B 3/08 | |
| 2005/0252428 | A1 * | 11/2005 | Yamin | D06H 7/00 | 108/139 |
| 2012/0181907 | A1 * | 7/2012 | Edwards | A47B 49/00 | 312/249.4 |
| 2013/0019783 | A1 * | 1/2013 | Wang | H05B 6/6426 | 248/163.1 |
| 2024/0335736 | A1 * | 10/2024 | Che | F16M 11/08 | |

FOREIGN PATENT DOCUMENTS

| | | | | |
|---|---|---|---|---|
| CN | 118510581 | A | 8/2024 | |
| DE | 202007006675 | U1 * | 10/2007 | A47B 13/10 |
| GB | 2242827 | A * | 10/1991 | A47B 13/08 |

* cited by examiner

PUZZLE BOARD

CROSS REFERENCE TO RELATED APPLICATION

This application claims priority to Chinese Patent Application No. 2025200796715, filed on Jan. 14, 2025, which is hereby incorporated by reference in its entirety.

TECHNICAL FIELD

The present application relates to the technical field of puzzle toys, and in particular to a novel puzzle board.

BACKGROUND

Puzzle games, as a classic intellectual game, have long been loved by people of all ages. Traditional puzzle boards usually only provide a flat table for players to perform puzzle operations, and after the puzzle is completed, puzzle pieces are often difficult to store neatly, resulting in scattered, lost, or difficult to quickly find the puzzle pieces again, which brings inconvenience to players.

To solve the above problems, some puzzle board designs with storage functions have emerged in the market. Many storage spaces are set up in the form of drawers on various sides of the puzzle boards to store puzzle pieces. However, these designs would lead to confusion about which puzzles are stored in each drawer, requiring the search for puzzle pieces at each drawer position, making it difficult to quickly find the desired puzzle pieces. Moreover, when usually moving the puzzle board, it is easy for the drawer to fall off.

In addition, with the continuous improvement of people's demand for gaming experience and personalization, traditional fixed puzzle boards no longer meet the players' needs for multi-angle and multi-scene use. The players hope to play the puzzle games from different angles and positions to increase the fun and challenge of the game.

Therefore, improvements need to be made to the puzzle boards.

SUMMARY

In view of the deficiencies in existing technologies mentioned above, the present disclosure aims to provide a novel puzzle board to address the problems raised in the background.

To achieve the above objectives, the present disclosure adopts the following technical solutions. In some embodiments of the present disclosure, a novel puzzle board is provided, including a top board, a frame, a bottom board, and a base. Herein the top board includes an upper board, a first bounding box set on one side of the upper board, and one or more limit blocks set on a bottom of the upper board. The frame includes a border formed by splicing second bounding boxes set on four sides, and the border contains storage spaces for store items. Where the second bounding boxes set on an upper side and a lower side each is provided with a fluted slide assembled with the upper board, and the limit blocks are placed between the storage spaces and the second bounding boxes to restrict the upper board from slidable opening or closing the storage spaces through an external force. The bottom board is fixedly connected to a bottom surface of the frame. The base includes a base board and a rotating component set on the base board, where the base board is connected to the bottom board through a connecting piece, and the rotating component is abutted with the bottom board to allow the bottom board rotates relative to the base drove by the external force.

In some preferred embodiments of the present disclosure, the rotating component includes a ball retainer, a ball slot set protruding from the ball retainer, and balls embedded in the ball slot. Where the ball slot is uniformly distributed along the ball retainer and the balls protrude from the ball slot and abut with the bottom board. When the frame rotates relative to the base, a bottom surface of the bottom board comes into rolling contact with the balls.

In some preferred embodiments of the present disclosure, two thirds of surfaces of the balls are wrapped by the ball slot, and the balls roll relative to the ball slot.

In some preferred embodiments of the present disclosure, the ball retainer has a circular ring shape, the ball slot is provided with at least two or more, and the ball slot is distributed in an array along a circumference of the ball retainer.

In some preferred embodiments of the present disclosure, the base board is concavely provided with an annular groove, and at least a part of the ball retainer is embedded in the annular groove.

In some preferred embodiments of the present disclosure, a thickness between upper and lower sides of the upper board is adapted to a groove width of the fluted slide to allow the upper board being embedded in the fluted slide.

In some preferred embodiments of the present disclosure, the boarder includes a long partition wall arranged inside the border and a short partition wall arranged inside the border. The long partition wall and the short partition wall are arranged alternately and form the storage spaces with the second bounding boxes. The long partition wall is provided with one, and the long partition wall is provided in a middle of the border and parallel to the second bounding boxes set on a long side. The short partition wall is provided with one or more, and the short partition wall is parallel to the second bounding boxes set on a short side.

In some preferred embodiments of the present disclosure, a vertical height of the long partition wall relative to a surface of the bottom board is the same as a vertical height of the short partition wall relative to the surface of the bottom board, and the vertical height is close to a position of a lower edge of the fluted slide.

In some preferred embodiments of the present disclosure, a bottom surface of the base board is provided with one or more non-slip mats.

In some preferred embodiments of the present disclosure, a hole is provided in a center position of the base board, and the connecting piece passes through the hole to connect with the bottom board.

Compared with the existing technologies, the puzzle board of the present disclosure has at least the following beneficial effects and advantages.

1. Efficient storage and convenient use. The frame is provided with the recessed storage spaces, which can easily store puzzle pieces or other small items, effectively solving the problem of scattered and difficult to organize the puzzle pieces. The storage location of the puzzle pieces or other small items is unified, making it more convenient to take and place. The upper board is embedded in the fluted slide of the frame, allowing users to easily open or close by simply pulling, making the operation convenient and improving the user experience.

2. Flexible rotation and multi-angle use. The rotating component is designed to allow the frame to rotate and adjust its position relative to the rotating component. Users can easily adjust the angle of the puzzle board according to their needs, providing more flexibility and fun for puzzle games. The combination of the ball retainer and the balls makes the rotation process smoother, thereby reducing friction and extending the service life.

3. Stable structure and easy to maintain it. The thickness of the upper board is adapted to the slot width of the fluted slide, ensuring the stability of the upper board during sliding and avoiding shaking or detachment. The ball retainer is embedded in the annular groove of the base board, with a compact and stable structure that is not easily damaged, and is also easy to clean and maintain.

4. Enhancing user experience and creative space. The novel puzzle board of the present disclosure not only can meet basic puzzle game needs, but also can provide the users with more creative and imaginative space through its unique design. The users can adjust the angle and position of the puzzle board according to their personal preferences and needs, thereby creating a more diverse puzzle gaming experience.

Figure 1:
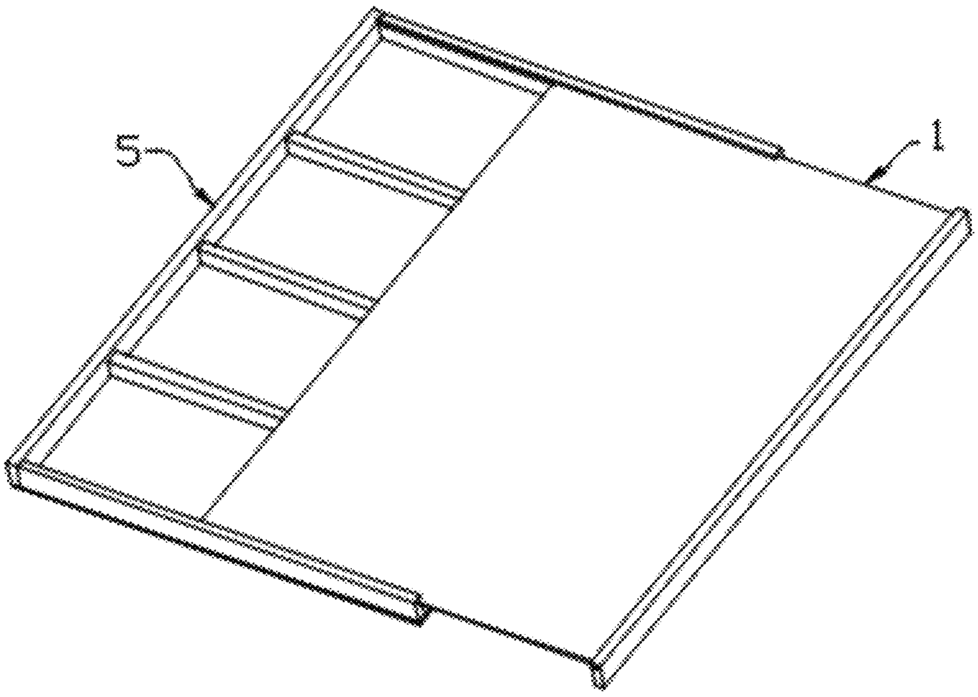
FIG. 1 shows a structural schematic diagram of a puzzle board in an open state in accordance with some embodiments of the present disclosure.
Figure 2:
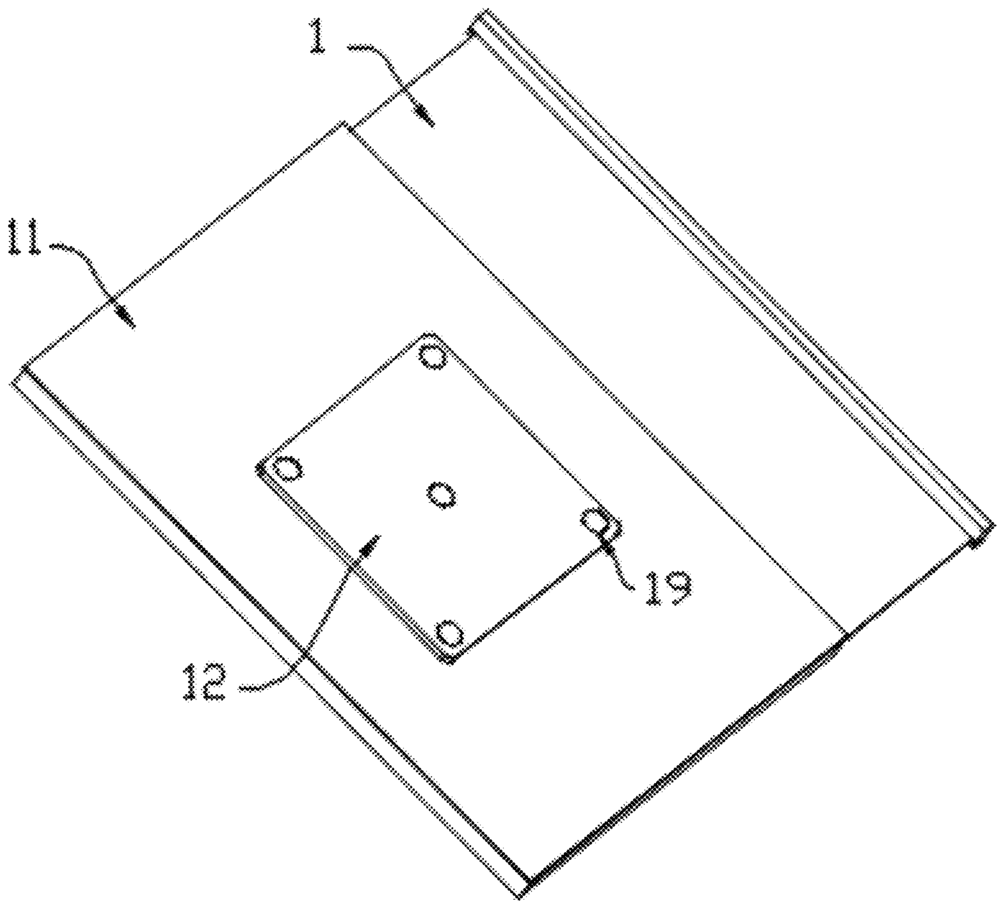
FIG. 2 shows the structural schematic diagram from another angle of FIG. 1.
Figure 3:
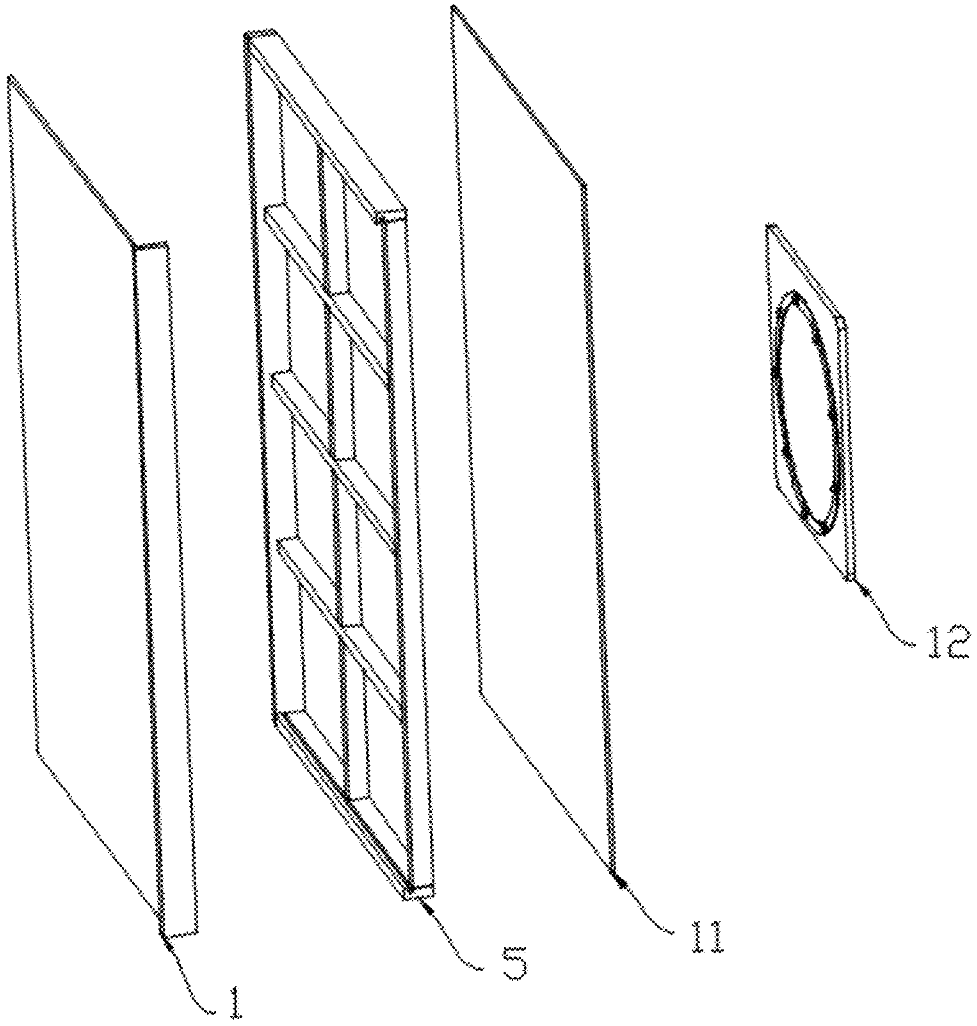
FIG. 3 shows an exploded view of the puzzle board in accordance with some embodiments of the present disclosure.
Figure 4:
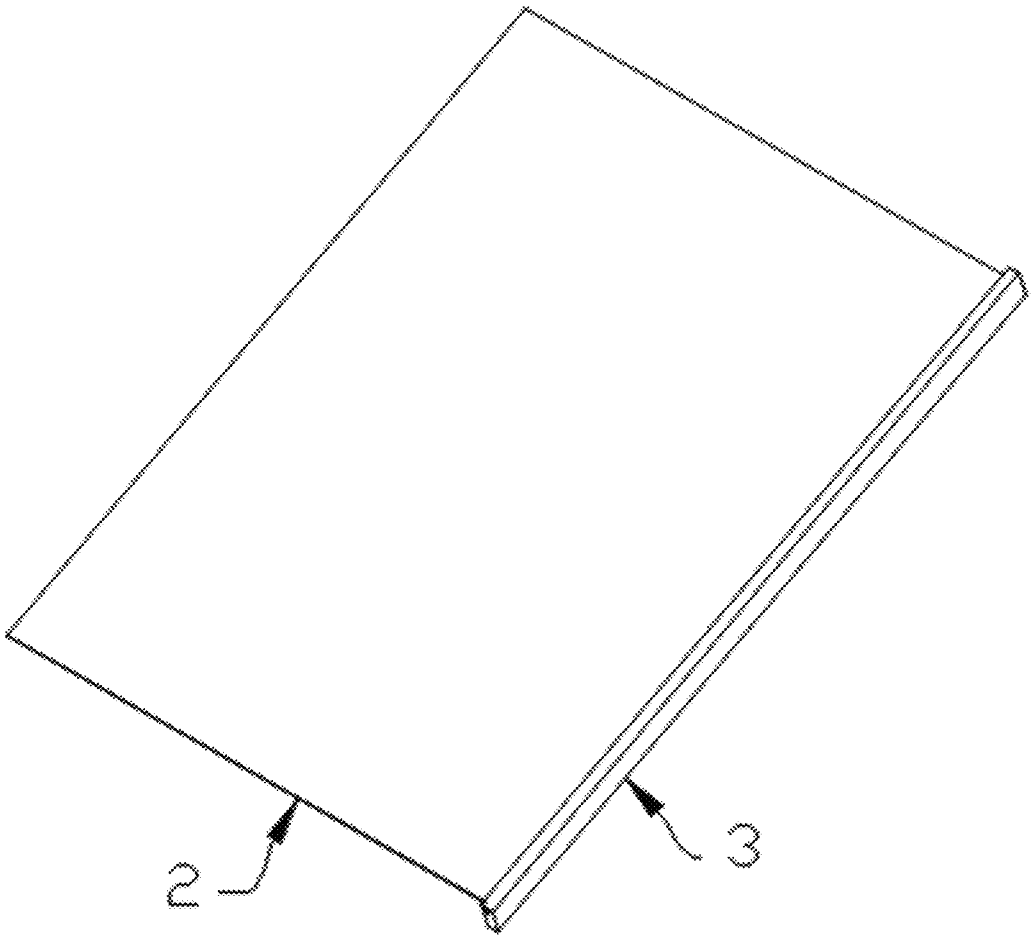
FIG. 4 shows a structural schematic diagram of a top board in accordance with some embodiments of the present disclosure.
Figure 5:
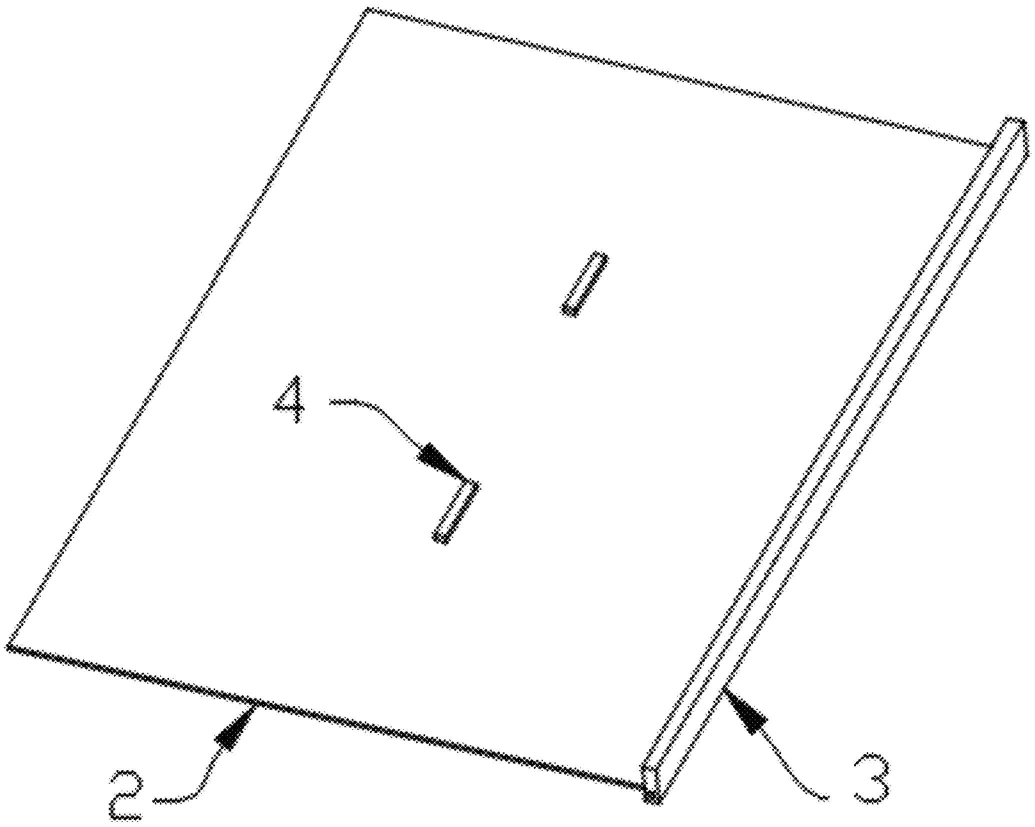
FIG. 5 shows the structural schematic diagram from another angle of FIG. 4.

In the drawings, reference numerals are as follows. 1. Top board, 2. Upper board, 3. First bounding box, 4. Limit block, 5. Frame, 6. Second bounding box, 7. Long partition wall, 8. Short partition wall, 9. Storage space, 10. Fluted slide, 11. Bottom board, 12. Base, 13. Base board, 14. Rotating component, 15. Ball retainer, 16. Ball slot, 17. Ball, 18. Annular groove, 19. Non-slip mat, 20. Hole.

DETAILED DESCRIPTION OF THE EMBODIMENTS

The following will provide a further detailed explanation of the puzzle board of the present disclosure in conjunction with the accompanying drawings.

Given the technical problems discussed in the background, as shown in FIGS. 1 to 11, in some embodiments of the present disclosure, a novel puzzle board is provided, including a top board 1, a frame 5, a bottom board 11, and a base 12. Herein the top board 1 includes an upper board 2, a first bounding box 3 set on one side of the upper board 2, and one or more limit blocks 4 set on a bottom of the upper board 2. The frame 5 includes a border formed by splicing second bounding boxes 6 set on four sides, and the border includes storage spaces 9 for store items, where the second bounding boxes 6 set on an upper side and a lower side each is provided with a fluted slide 10 assembled with the upper board 2, and the limit blocks 4 are placed between the storage spaces 9 and the second bounding boxes 6 to restrict the upper board 2 from slidable opening or closing the storage spaces 9 through an external force. The bottom board 11 is fixedly connected to a bottom surface of the frame 5. The base 12 includes a base board 13 and a rotating component 14 set on the base board 13, where the base board 13 is connected to the bottom board 11 through a connecting piece, and the rotating component 14 is abutted with the bottom board 11 to allow the bottom board 11 rotates relative to the base 12 drove by the external force.

Referring to FIG. 8 to FIG. 11, the rotating component 14 includes a ball retainer 15, a ball slot 16 set protruding from the ball retainer 15, and balls 17 embedded in the ball slot 16. The ball slot 16 is uniformly distributed along the ball retainer 15, and the balls 17 protrude from the ball slot 16 and abut with the bottom board 11. When the frame 5 rotates relative to the base 12, a bottom surface of the bottom board 11 comes into rolling contact with the balls 17.

Herein two thirds of surfaces of the balls 17 are wrapped by the ball slot 16, and the balls 17 roll relative to the ball slot 16.

Herein the ball retainer 15 has a circular ring shape, the ball slot 16 is provided with at least two or more, and the ball slot 16 is distributed in an array along a circumference of the ball retainer 15.

Herein the base board 13 is concavely provided with an annular groove 18, and at least a part of the ball retainer 15 is embedded in the annular groove 18.

Herein a thickness between the upper and lower sides of the upper board 2 is adapted to a groove width of the fluted slide 10 to allow the upper board 2 being embedded in the fluted slide 10. The slot width of the fluted slide 10 is adapted to the thickness of the upper board 2 to ensure that the upper board 2 can be firmly embedded in the fluted slide 10 and slide smoothly.

Figure 6:
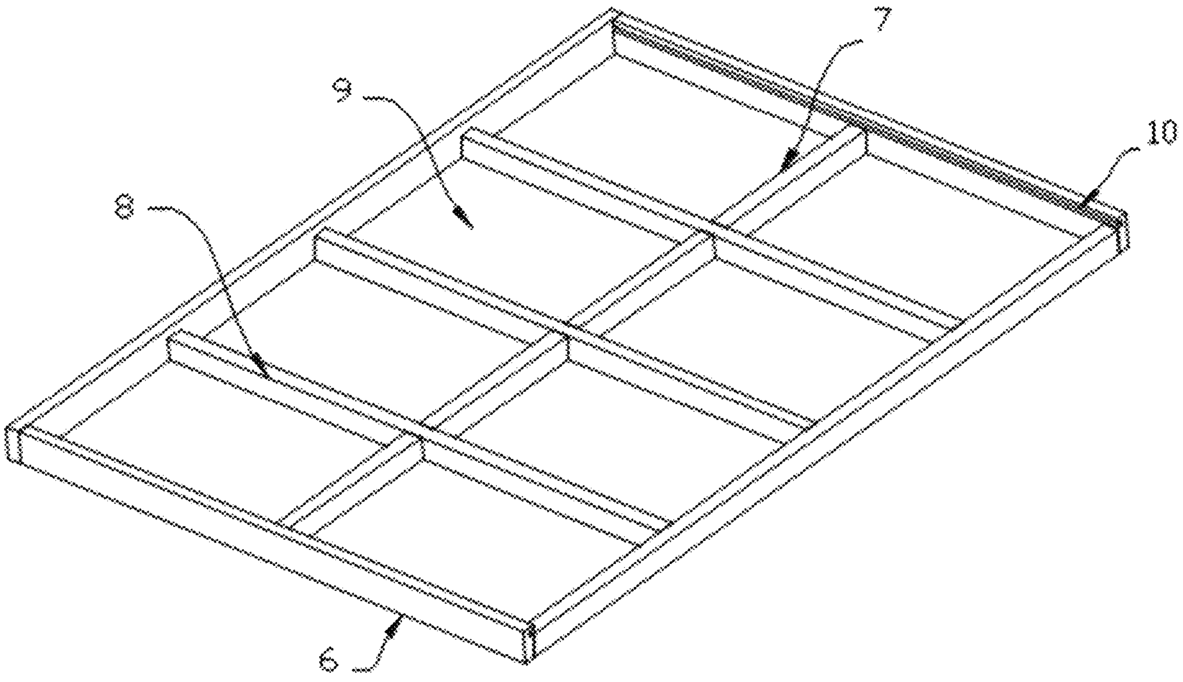
FIG. 6 shows a structural schematic diagram of a frame in accordance with some embodiments of the present disclosure.

Referring to FIG. 6, the boarder includes a long partition wall 7 arranged inside the border and a short partition wall 8 arranged inside the border. The long partition wall 7 and the short partition wall 8 are arranged alternately and form the storage spaces 9 with the second bounding boxes 6. The long partition wall 7 is provided with one, and the long partition wall 7 is provided in a middle of the border and parallel to the second bounding boxes 6 set on a long side. The short partition wall 8 is provided with one or more, and the short partition wall 8 is parallel to the second bounding boxes 6 set on a short side.

Herein a vertical height of the long partition wall 7 relative to a surface of the bottom board 11 is the same as a vertical height of the short partition wall 8 relative to the surface of the bottom board 11, and the vertical height is close to a position of a lower edge of the fluted slide 10.

Figure 10:
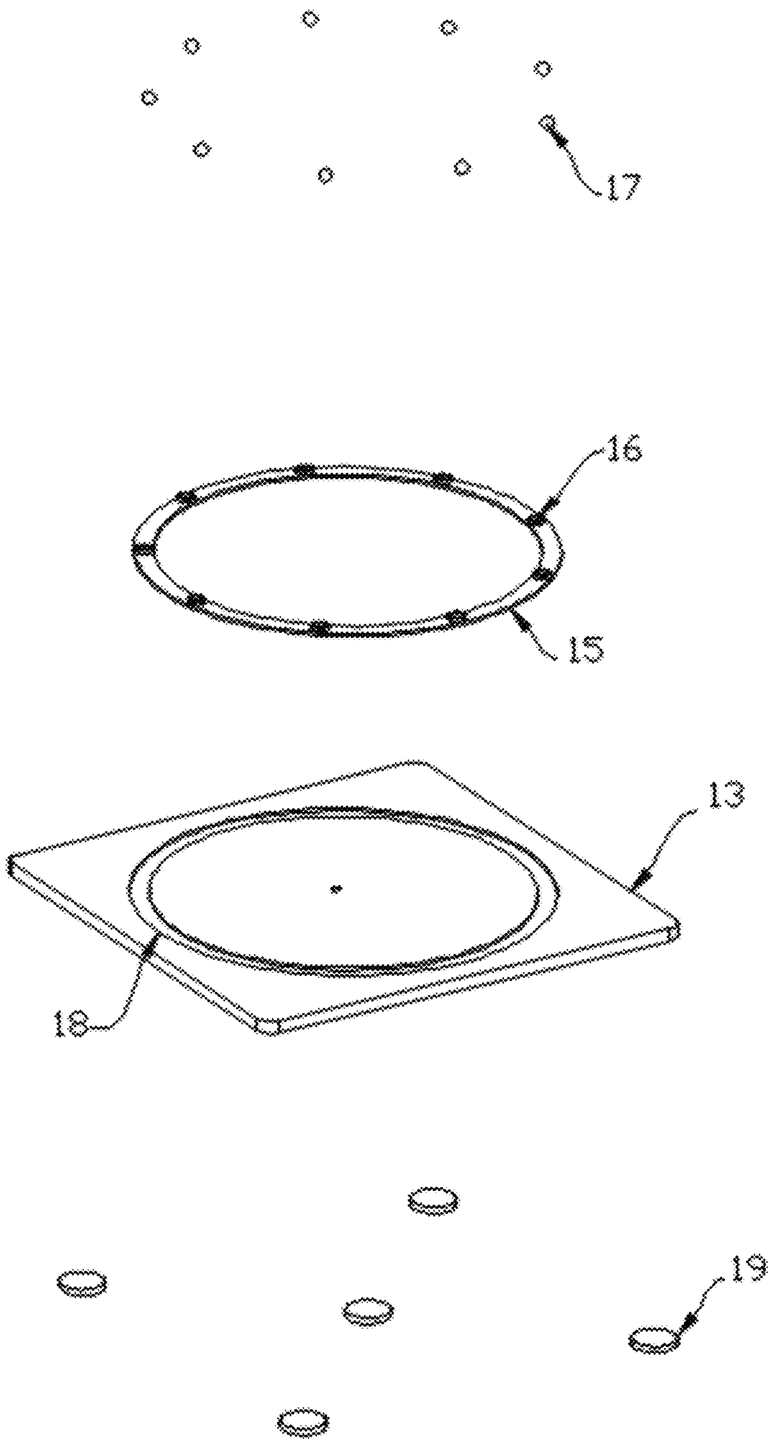
FIG. 10 shows a structural schematic diagram of a rotating component in accordance with some embodiments of the present disclosure.
Figure 11:
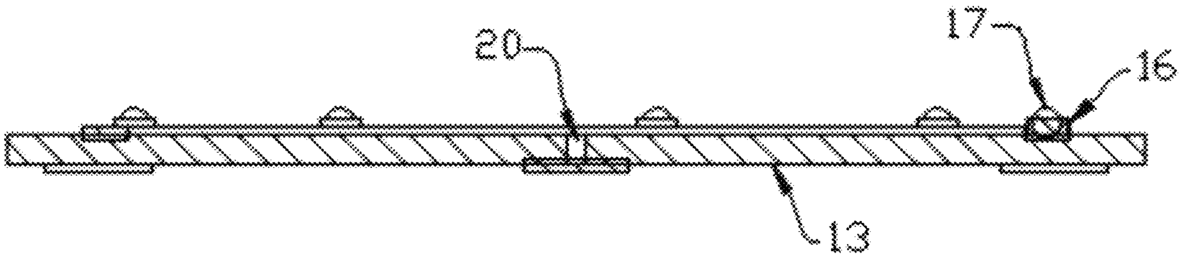
FIG. 11 shows a sectional view of the base in accordance with some embodiments of the present disclosure.

Referring to FIG. 10, a bottom surface of the base board 13 is provided with one or more non-slip mats 19.

Herein a hole 20 is provided in a center position of the base board 13, and the connecting piece passes through the hole 20 to connect with the bottom board 11.

In the above technical solutions, a novel puzzle board is provided, which mainly consists of the top board 1, the frame 5, the bottom board 11, and the base board 13.

Figure 7:
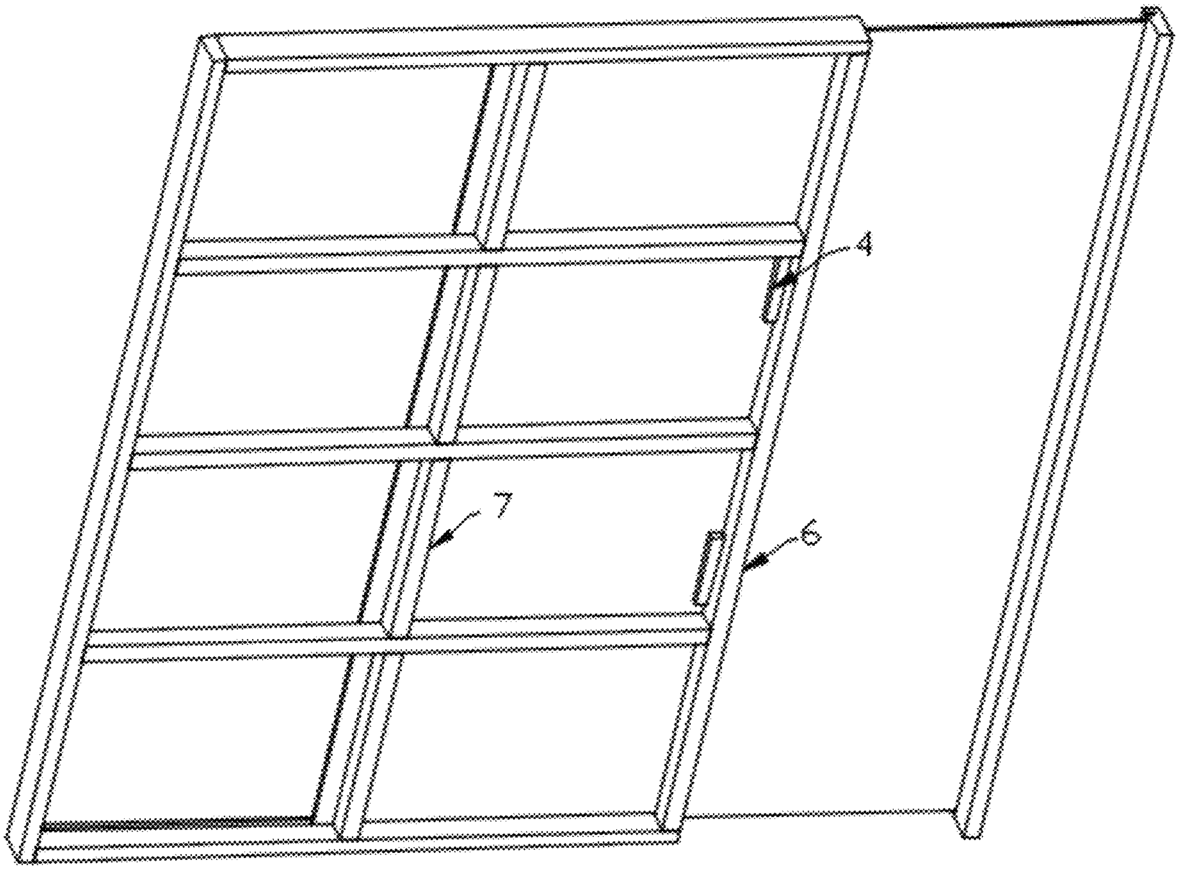
FIG. 7 shows a structural schematic diagram of the frame and the top board in accordance with some embodiments of the present disclosure.
Figure 8:
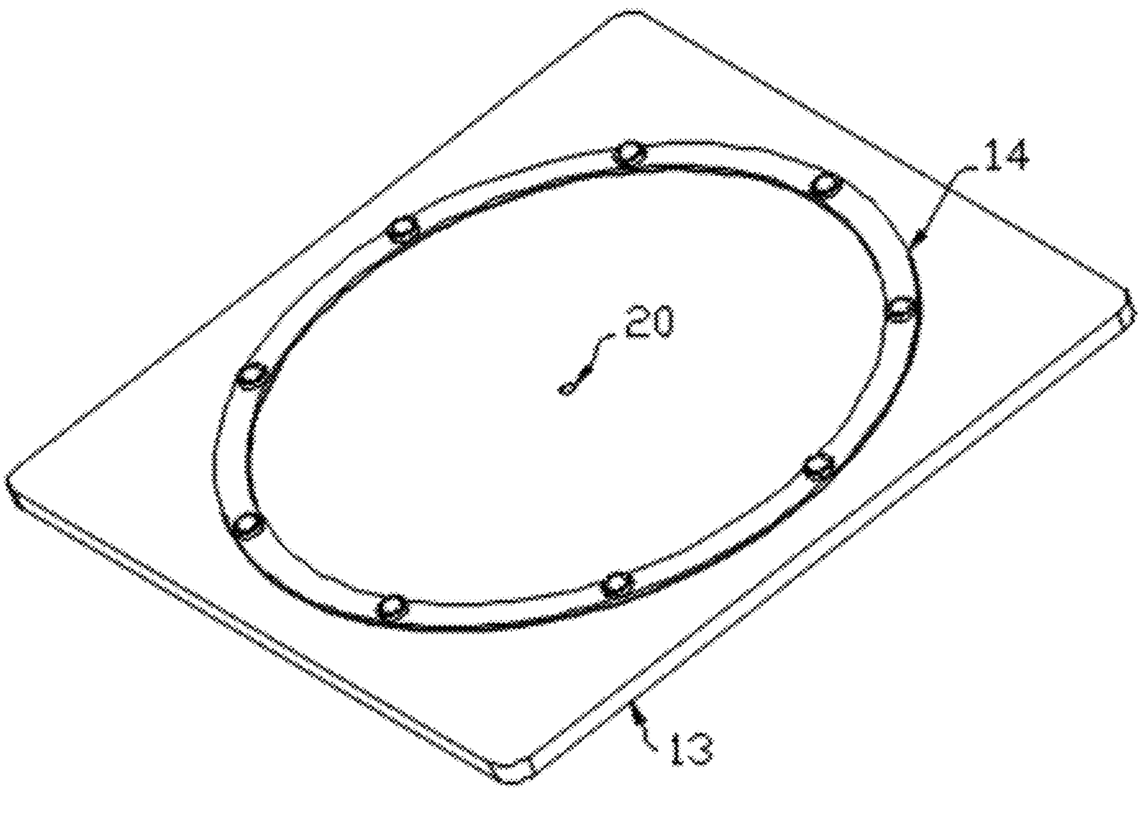
FIG. 8 shows a structural schematic diagram of a base in accordance with some embodiments of the present disclosure.
Figure 9:
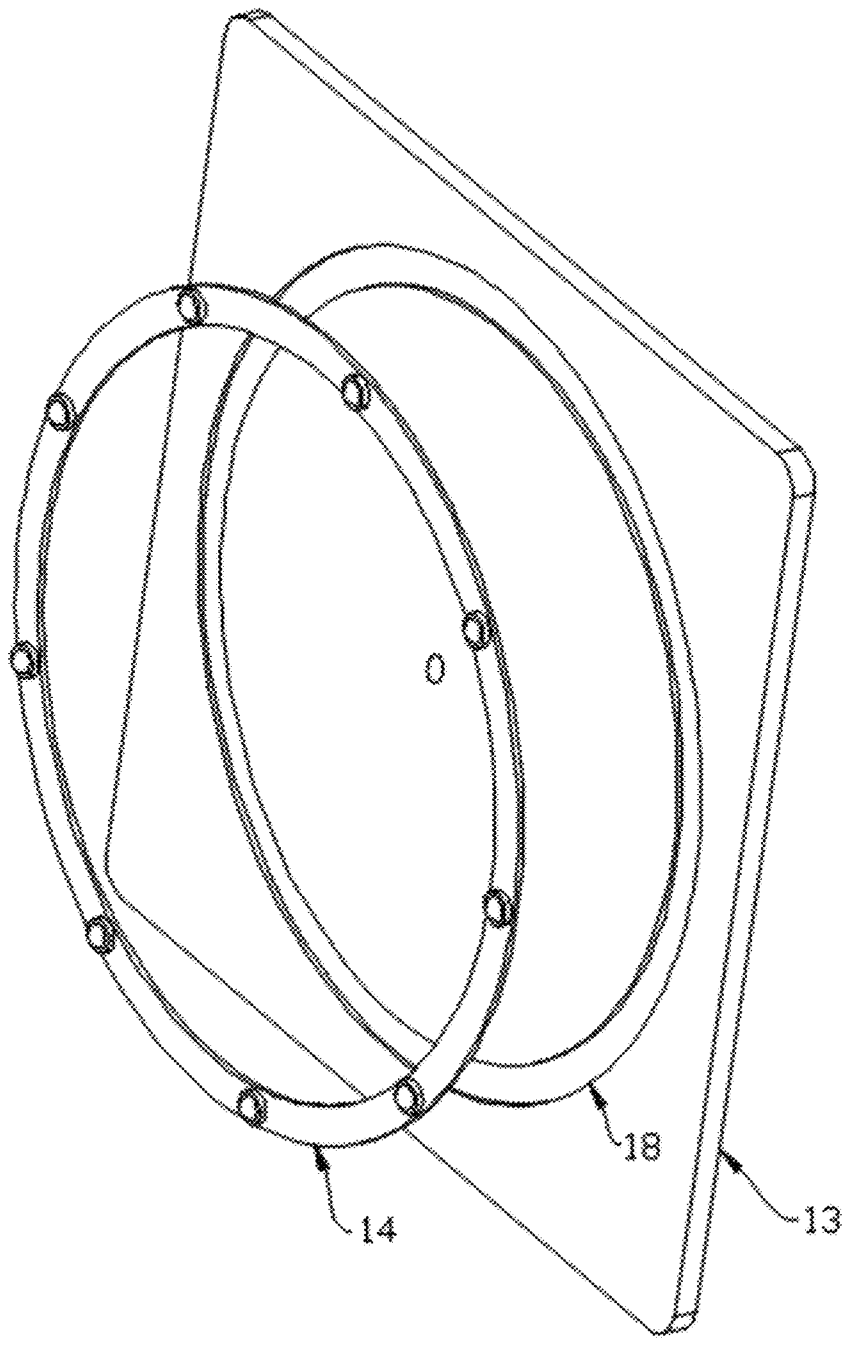
FIG. 9 shows an exploded view of the base in accordance with some embodiments of the present disclosure.

The top board 1 includes the upper board 2, the first bounding box 3 and the limit blocks 4. The top board 1 is made of sturdy and smooth materials, such as high-density fiberboard or acrylic board, for use as a control console of puzzle game. The first bounding box 3 is fixed on the longer side of the top board 1, when the top board 1 closes the storage spaces 9, the first bounding box 3 contacts the second bounding box 6, and the upper and lower sides of the upper board 2 are placed on the fluted slide 10. Referring to FIG. 7, at the same time, the limit blocks 4 may be set in the form of one or more blocks. The limit blocks 4 are contacted with the upper board 2, and the limit blocks 4 are placed between the long partition wall 7 and the second bounding boxes 6. Therefore, when the upper board 2 is opened by external force, it cannot be completely pulled out, avoiding the upper board 2 from being pulled out and causing it to fall. And meanwhile, it can open all storage spaces 9, making it easier for users to find and place, and more convenient.

Referring to FIG. 6, the frame 5 is made of sturdy and durable materials, such as wood or plastic, to ensure overall stability and durability. The frame 5 includes the second bounding boxes 6, the long partition walls 7 and the short partition walls 8. The second bounding boxes 6 on the four sides are enclosed to form the border. The appropriate number of the long partition walls 7 and the short partition walls 8 can be selected according to the actual situation, and there is not restriction on this. In some embodiments of the present disclosure, it is preferred to use one long partition wall 7 and three short partition walls 8, and the border has a rectangular structure. The long partition wall 7 is provided in the middle of the border and parallel to the second bounding boxes 6 set on a long side of the border, the three short partition walls 8 are parallel to the second bounding boxes 6 set on a short side of the border. Furthermore, the long partition wall 7, the short partition walls 8, the second bounding boxes 6, and the bottom board 11 together form the storage spaces 9. The vertical height of long partition wall 7 and the short partition walls 8 relative to the surface of the bottom board is the same, and the vertical height is close to the position of the lower edge of the fluted slide 10, which does not obstruct the closure of the upper board 2.

Referring to FIG. 8 to FIG. 11, the base 12 consists of the base board 13, the rotating component 14, and the non-slip mats 19. The center position of the base board 13 is fixed to the bottom board with screws or iron nails. There are one or more nail holes on the center surface of the base board 13, which are used for the screws or iron nails to be fixed to the bottom board. The base board 13 has a stable support structure to ensure that it can be stably placed on the ground.

The ball retainer 15 has a circular ring shape and is embedded in the concave annular groove 18 on the base board 13. The ball slots 16 are set protruding from the ball retainer 15, and the ball slots 16 are evenly distributed along the circumference of the ball retainer 15, with each ball slot 16 is mobile embedded with the balls 17. The balls 17 are in contact with the bottom surface of the upper board 2, when the frame 5 rotates relative to the base 12, the bottom surface of the upper board 2 rolls in contact with the balls 17, achieving a smooth rotation effect.

Through the description of the specific implementations above, it can be seen that the novel puzzle board of the present disclosure has the advantages of compact structure, diverse functions, and convenient operation, which can meet the comprehensive needs of players for storage, convenient use, and game fun.

The above does not limit the technical scope of the present invention in any way. Any amendments, equivalent changes, and modifications made to the above embodiments based on the technical essence of the present disclosure shall fall within the scope of the technical solutions of the present invention.

What is claimed is:

1. A puzzle board, comprising:

a top board, comprising an upper board, a first bounding box set on one side of the upper board, and one or more limit blocks set on a bottom of the upper board;

a frame, comprising a border formed by splicing second bounding boxes set on four sides, and the border comprises storage spaces for store items; wherein the second bounding boxes set on an upper side and a lower side each is provided with a fluted slide assembled with the upper board, and the limit blocks are placed between the storage spaces and the second bounding boxes to restrict the upper board from slidable opening or closing the storage spaces through an external force;

a bottom board, fixedly connected to a bottom surface of the frame; and a base, comprising a base board and a rotating component set on the base board, wherein the base board is connected to the bottom board through a connecting piece, and the rotating component is abutted with the bottom board to allow the bottom board rotates relative to the base drove by the external force.

2. The puzzle board according to claim 1, wherein the rotating component comprises a ball retainer, a ball slot set protruding from the ball retainer, and balls embedded in the ball slot;

wherein the ball slot is uniformly distributed along the ball retainer, and the balls protrude from the ball slot and abut with the bottom board; and wherein when the frame rotates relative to the base, a bottom surface of the bottom board comes into rolling contact with the balls.

3. The puzzle board according to claim 2, wherein two thirds of surfaces of the balls are wrapped by the ball slot, and the balls roll relative to the ball slot.

4. The puzzle board according to claim 2, wherein the ball retainer has a circular ring shape, the ball slot is provided with at least two or more, and the ball slot is distributed in an array along a circumference of the ball retainer.

5. The puzzle board according to claim 2, wherein the base board is concavely provided with an annular groove, and at least a part of the ball retainer is embedded in the annular groove.

6. The puzzle board according to claim 1, wherein a thickness between upper and lower sides of the upper board is adapted to a groove width of the fluted slide to allow the upper board being embedded in the fluted slide.

7. The puzzle board according to claim 1, wherein the border comprises a long partition wall arranged inside the border and a short partition wall arranged inside the border;

wherein the long partition wall and the short partition wall are arranged alternately and form the storage spaces with the second bounding boxes;

wherein the long partition wall is provided with one, and the long partition wall is provided in a middle of the border and parallel to the second bounding boxes set on a long side; and wherein the short partition wall is provided with one or more, and the short partition wall is parallel to the second bounding boxes set on a short side.

8. The puzzle board according to claim 7, wherein a vertical height of the long partition wall relative to a surface of the bottom board is the same as a vertical height of the short partition wall relative to the surface of the bottom board, and the vertical height is close to a position of a lower edge of the fluted slide.

9. The puzzle board according to claim 1, wherein a bottom surface of the base board is provided with one or more non-slip mats.

10. The puzzle board according to claim 1, wherein a hole is provided in a center position of the base board, and the connecting piece passes through the hole to connect with the bottom board.

* * * * *